United States Patent [19]

Horiuchi et al.

[11] 4,181,742

[45] Jan. 1, 1980

[54] METHOD OF PREVENTING GUSHING OF PACKAGED BEER

[75] Inventors: Goh Horiuchi; Seizo Yabuuchi, both of Yokohama; Satoru Suzuki, Suita; Mikio Amaha, Tokyo, all of Japan

[73] Assignee: Asahi Breweries, Ltd., Tokyo, Japan

[21] Appl. No.: 915,922

[22] Filed: Jun. 15, 1978

Related U.S. Application Data

[63] Continuation-in-part of Ser. No. 815,912, Jul. 15, 1977, abandoned.

[30] Foreign Application Priority Data

Apr. 13, 1977 [JP] Japan .................................. 52/42169

[51] Int. Cl.$^2$ ............................ C12H 1/14; C12B 1/18
[52] U.S. Cl. ........................................ 426/12; 426/13; 426/329
[58] Field of Search ....................... 426/11, 12, 13, 16, 426/329

[56] References Cited

U.S. PATENT DOCUMENTS

| 2,077,449 | 4/1937 | Wallerstein | 426/12 |
| 2,848,371 | 8/1958 | Yoshida | 426/12 X |
| 3,366,483 | 1/1968 | Stone | 426/12 |
| 3,740,233 | 6/1973 | Nelson et al. | 426/12 |

*Primary Examiner*—David M. Naff
*Attorney, Agent, or Firm*—Blanchard, Flynn, Thiel, Boutell & Tanis

[57] ABSTRACT

Most beers brewed with the addition of cysteine proteases, such as papain, ficin or bromelain, for the purpose of chillproofing develop a tendency to gush or foam excessively after being stored in bottles and cans for 1 to 3 months. This gushing tendency is obviated by adding during the beer manufacturing process a special kind of acid protease whose proteolytic activity is specifically inhibited by the pepsin inhibitor S-PI from *Streptomyces naniwaensis.*

7 Claims, No Drawings

4,181,742

METHOD OF PREVENTING GUSHING OF PACKAGED BEER

CROSS-REFERENCE TO RELATED APPLICATION

This application is a continuation-in-part of Ser. No. 815,912, filed July 15, 1977, now abandoned.

BACKGROUND OF THE INVENTION

1. FIELD OF THE INVENTION

The present invention relates to a method of manufacturing beer which is free of a gushing tendency. The term "gushing", in the present invention, means the phenomenon that excessive foaming occurs when a container filled with beer, such as a bottle, can and the like, is opened.

2. DESCRIPTION OF THE PRIOR ART

As the causes of gushing of packaged beer, the presence of calcium oxalate micro-crystals, the presence of some metallic ions such as iron and nickel, the inclusion of nitrogen gas and/or hydrogen gas, the use of weathered barley cultivated and harvested under unpropitious weather conditions, the presence of a certain kind of gushing-inducing substance in hop extracts, etc. have been pointed out by many research workers (cf. P. Gjertsen et al., Proceedings European Brewery Convention, 9th Congress, Brussels, p. 320 (1964), and M. Amaha et al, Proceedings European Brewery Convention, 14th Congress, Salzburg, p. 381 (1973)). But all the causes of beer gushing have not been entirely clarified. The causes and extent of beer gushing are very diversified, qualitatively as well as quantitatively, depending on the raw materials employed in making the beer, the method of brewing used, the number of days of aging after packaging the beer in a container, and so on. In an extreme case of gushing, about one-half of the contents of packaged beer may overflow the container immediately after the container is opened.

The phenomenon of "market gushing" is one of the phenomena whose cause is yet to be clarified. Market gushing is characterized by the facts that gushing does not occur when the beer container is opened immediately after it has been filled with beer, but signs of the gushing phenomenon are exhibited with gradually increasing severity when the packaged beer is left standing in warehouses and/or in retail stores for several weeks. This market gushing phenomenon is very frequently encountered in retail stores, but no effective counter-measures have so far been taken because the cause thereof is unknown.

SUMMARY OF THE INVENTION

The present inventors have discovered that the market gushing tendency is inherent to those beers brewed conventionally using cysteine proteases as a chillproofing agent and that the use of a special kind of acid protease during the beer manufacturing process makes it possible to prepare beer which is free of the market gushing tendency. The present invention has been accomplished on the basis of this discovery. The invention relates to a method of preventing the occurrence of market gushing of packaged beer, wherein an acid protease, whose activity is inhibited by the pepsin inhibitor S-PI which latter is produced by *Streptomyces naniwaensis* (cf. S. Satoi and S. Murao, Agricultural and Biological Chemistry, 35, 1482, 1971), is added to cold wort, fermenting wort, green beer or finished beer prior to packaging. The pepsin inhibitor S-PI is a pentapeptide and it inhibits the proteolytic activity of pepsin and certain other acid proteases. Some of the acid proteases are not inhibited by S-PI as has been reported by Satoi and Murao (Agricultural and Biological Chemistry, Vol. 37, 2579, (1973)). Only those acid proteases whose activity is specifically inhibited by S-PI are effective and useful in this invention.

DESCRIPTION OF THE PREFERRED EMBODIMENTS

Cysteine proteases such as papain are commonly used as chillproofing agents in brewing beer. As a result of a series of tests conducted by the present inventors, however, it has been newly found that the use of these enzymes causes the market gushing of beer, which is the problem with which the present invention is concerned. Table-1 contains test results showing that cysteine proteases cause market gushing of beer. In these tests, beer was made with and without using papain as the chillproofing agent. The finished beer was packaged in 633 ml-bottles. These bottles were then stored at 25° C. in order that the mode of the occurrence of the market gushing phenomenon could be examined. Duplicate samples of each type of beer were taken at intervals of 15 days and were treated by the following procedure to determine the gushing tendency thereof. In each test, two beer bottles were first placed on their sides and then were held in that position at 0° C. for 72 hours, then they were placed in an upright position and maintained in that position at 25° C. for 90 minutes, then they were inverted gently three times in a time period of 10 seconds, then they were placed in an upright position for 30 seconds, and then they were opened. The volume of beer (ml) that overflowed the bottles was measured and the mean value of the two runs was used as a measure of the market gushing tendency.

Table-1.

| Beer Sample | Development of gushing tendency in bottled beer | | | | | |
|---|---|---|---|---|---|---|
| | Gushing tendency (ml) after storing at 25° C. for | | | | | |
| | 0 day | 15 days | 30 days | 45 days | 60 days | 75 days |
| Beer treated with papain | 0 | 0 | 15 | 35 | 70 | 75 |
| Beer not treated with papain | 0 | 0 | 0 | 0 | 0 | 0 |

As will be understood from the results of the tests set forth in Table-1, beer treated with papain began to show gushing after 30 days' storage at 25° C., and this gushing tendency increased gradually and steadily until the period of storage reached 75 days. In contrast, beer which had not been treated with papain was quite free of gushing tendency even after 75 days' storage. This shows that the presence of papain has a great effect on the market gushing phenomenon. Similar phenomena were also observed when other cysteine proteases, such as ficin and bromelain, were used in place of papain. This shows that the market gushing phenomenon is attributable to the effects of cysteine proteases. It is important to note here that all the beers which were not treated with papain (or other cysteine proteases) showed extended degrees of haziness when cooled at 0° C., even though they did not show any gushing tendency.

As a result of further detailed investigations, it has been clarified that cysteine proteases, such as papain, Murao, Agricultural and Biological Chemistry, Vol. 35, 1482 (1971)).

| PURIFICATION PROCEDURE OF PEPSIN INHIBITOR (S-PC) | |
|---|---|
| Supernatant of culture broth ↓ | 0.5 satn. with $(NH_4)_2SO_4$ |
| Precipitate ↓ | extracted with MeOH, filtered |
| MeOH soln. ↓ | dried, dissolved in water, filtered |
| Filtrate ↓ | adsorbed on active carbon |
| Active carbon ↓ | washed with hot NaOH soln. extracted with MeOH |
| MeOH soln. ↓ | gel filtration on Sephadex LH-20 column, eluted with MeOH |
| Active fraction ↓ | chromatography on silica gel column, eluted with Benzene : MeOH : AcOH = 90 : 10 : 2 |
| D-fraction ↓ | dried and dissolved in MeOH, gel filtration on Sephadex LH-20 column, eluted with MeOH |
| Active fraction ↓ | concentrated |
| Crystalline S-PI | | act on proteins and/or polypeptides present in beer, thereby to produce precursors of gushing-inducing factors which appear to become "nuclei" for causing a spontaneous liberation of carbon dioxide in beer, i.e., gushing, at the instant of opening the bottles or cans. Based on the results of these detailed investigations, the present inventors have discovered that the use of a special kind of acid protease, whose activity is inhibited by the pepsin inhibitor S-PI derived from *Streptomyces naniwaensis*, has a very specific effect of decomposing the above gushing factors and/or their precursors, thereby resulting in a complete suppression or inhibition of the occurrence of the market gushing. The results of the investigations are summarized in Table-2. It is evident that only those acid proteases whose proteolytic activity is inhibited by the pepsin inhibitor S-PI are capable of inhibiting the market gushing of beer. The sensitivity of acid proteases to the pepsin inhibitor S-PI was determined by the following inhibition test. Each enzyme was dissolved in citrate buffer (pH 4.2) in a concentration of 10 mg/ml. To 1 ml of this enzyme solution was added 1 ml of S-PI solution (1 mg/ml, in the same buffer) to effect inhibition. After incubating for 15 minutes at 30° C., the residual proteolytic activity was determined by the modified Anson's method as follows. One ml of the enzyme solution (with or without S-PI) was incubated at 30° C. for 10 minutes with 9.0 ml of 1% Hammersten casein solution in citrate buffer. The reaction was stopped with 20 ml of 0.44 M trichloroacetic acid. After adding 5 ml of 0.4 M sodium carbonate and 1 ml of Folin-Ciocalteau reagent to 1 ml of the filtrate, the absorbance was read at 660 nm.

The pepsin inhibitor S-PI was first isolated by Murao and Satoi (cf. Agricultural and Biological Chemistry, Vol. 35, 1477 (1971)) from culture filtrate of *Streptomyces naniwaensis*. Using a peptone-salt medium composed of polypeptone (5%), $K_2HPO_4$ (0.1%), NaCl (0.1%), $MgSO_4.7H_2O$ (0.05%), $FeSO_4.7H_2O$ (0.001%), $CuSO_4.5H_2O$ (0.0001%), $ZnSO_4.7H_2O$ (0.0001%), and $MnSO_4$ (0.0001%), the above Streptomyces strain can be cultivated in a Jar Fermentor at 27° C., and the specific inhibitor S-PI is easily isolated in a crystalline form from the culture filtrate following the procedure as shown in the following flow diagram (cf. S. Satoi and S.

The S-PI is a pentapeptide, (acetyl-valyl)-(valyl)-(4-amino-3-hydroxy-6-methyl-heptanoic acid)-(alanyl)-(4-amino-3-hydroxy-6-methyl-heptanoic acid), having a molecular weight of 644. Its chemical properties and inhibiting behavior against acid proteases have been described (S. Satoi and S. Murao, Agric. Biol. Chem., Vol., 37, 2579 (1973)).

Table-2

Relationship between the sensitivity to the pepsin inhibitor S-PI of acid proteases and the gushing-inhibiting effect.

| Enzymes | Source | Origin | Inhibition by S-PI | Gushing-Inhibiting effect |
|---|---|---|---|---|
| Molsin | Seishin Pharmaceutical Co. Ltd. | *Aspergillus saitol* | + | + |
| Acid Protease type B | Laboratory-made | *Aspergillus niger* | + | + |
| Newlase | Amano *Rhizopus* ceutical Co. Ltd. | *Rhizopus chinensis* | + | + |
| Rapidase | Takeda Chemical Industries, Ltd. | *Tr.metes sanguinea* | + | + |
| Acid Protease S | Prof. S. Murao | *Scytalidium lignicolum* | − | − |
| Acid Protease type A | *Aspergillus* | *Aspergillus niger* | − | − |

The effect, on the market gushing tendency, of acid proteases whose activity is inhibited by the pepsin inhibitor S-PI will be further elucidated in the embodiments of the invention described later on. Other acid proteases whose activity is not inhibited by the foregoing pepsin inhibitor S-PI, such as the acid protease produced by *Scytalidium lignicolum* (cf. S. Murao et al, Agricultural and Biological Chemistry, 36, 1647, 1972) have no effect in inhibiting the gushing tendency (cf. Table-2) supra. Accordingly, it has been ascertained that the gushing-inhibiting effect is critically based on the property of whether or not the acid protease is sensitive to said pepsin inhibitor S-PI.

As the acid proteases useful in the present invention, there are used one or more acid proteases whose activity is inhibited by the pepsin inhibitor S-PI produced by *Streptomyces naniwaensis* as described above. Useful acid proteases are produced by the microorganisms

*Aspergillus niger, Aspergillus carbonarius, Aspergillus ficuum, Aspergillus phoenicis, Aspergillus pulverulentus, Aspergillus awamori, Aspergillus heteromorphus, Aspergillus foetidus, Aspergillus aureus, Aspergillus japonicus, Aspergillus aculeatus, Aspergillus ellipticus, Aspergillus saitoi, Aspergillus sojae, Aspergillus inui, Aspergillus oryzae, Rhizopus chinensis, Trametes sanguinea, Mucor pusillus, Mucor miehei, Penicillium duponti, Penicillium janthinellum, Endomycopsis fibuligera, Rhodotorula glutinis,* etc.

To obtain acid proteases from these microorganisms, each microorganism culture is cultivated either on solid media or in liquid media, at their respective optimum growth temperatures. The acid proteases produced in the media are then extracted with water and/or concentrated, and then they are selectively precipitated by the addition of suitable amounts of ethyl alcohol. The precipitates are separated by centrifugation and then are lyophilized. Further purification can be carried out through appropriate chromatographic procedures, if necessary.

The use of enzymes for chillproofing of beer has long been known, and certain cysteine proteases, particularly papain, have been used almost exclusively in the brewing industry. Although some previous prior art (U.S. Pat. No. 2,077,499, U.S. Pat. No. 3,366,483 and U.S. Pat. No. 3,740,233) have disclosed the use of some mold enzymes for chillproofing beer, none of the mold proteases appears to have been in practical use for chillproofing beer. During the investigations that led to the present invention, the chillproofing effects of some commercial preparations of acid proteases were tested singly, and in combination with papain. The enzyme preparations used were Molsin (Seishin Pharmaceutical Company) obtained from *Aspergillus saitoi*, Newlase (Amano Pharmaceutical Company) obtained from *Rhizopus chinensis*, and Rapidase (Takeda Chemical Industries, Ltd.) obtained from *Trametes sanguinea*. The enzymes were added to young beer in a concentration of 20 ppm at the end of the fermentation, and the finished beer was bottled after lagering for 40 days at 0° C. After storing the bottled beer at 25° C. for 60 days, the beer bottles were kept at 0° C. for 48 hours and the increment in the haziness was determined: as a measurement of chill stability of the beer. The gushing tendency of the bottled beer was also tested on the same samples, using the gushing test method described previously. The results of these experiments are shown in Table-3.

Table-3

Effects of the addition of acid proteases on the chillproofing and the market gushing tendency of packaged beer.

| Enzymes | Increment of Chill Haze (E.B.C. Haze Unit) | Gushing Tendency (ml/633ml) |
|---|---|---|
| None | 4.0 | 0 |
| Papain 20ppm | 1.0 | 70 |
| Ficin 20ppm | 1.0 | 75 |
| Molsin 20ppm | 4.0 | 0 |
| Newlase 20ppm | 4.0 | 0 |
| Rapidase 20ppm | 4.0 | 0 |
| Papain Molsin + 20ppm 20ppm | 1.0 | 0 |
| Papain Newlase + 20ppm 20ppm | 1.0 | 0 |
| Papain Rapidase + 20ppm 20ppm | 1.0 | 0 |

It is seen that the three acid proteases are not effective for chillproofing when used alone and they do not improve the chillproofing effect of papain. But they are all effective for inhibiting the occurrence of the gushing tendency. The fact that acid proteases of microbial origin are not effective for chillproofing of beer has also been reported by K. Arima et al. (Agricultural and Biological Chemistry, Vol. 37, 2351, 1973).

It is a new finding and is an important feature of the present invention that the acid proteases, which are not effective for chillproofing beer, are used for preventing the occurrence of the market gushing tendency which results from the conventional use of cysteine proteases, such as papain, as the chillproofing agent. The present invention is also characterized, as stated before, by the finding that only those acid proteases whose proteolytic activity is specifically inhibited by the pepsin inhibitor S-PI are effective for inhibiting the occurrence of a gushing tendency of packaged beer.

The present invention is characterized by the addition of a special acid protease, as described above, to cold wort, fermenting wort, green beer or finished beer. The special acid protease can be added before or after adding the cysteine protease, such as papain, to beer for the purpose of chillproofing same or it can be added simultaneously with the addition of the cysteine protease. The cysteine protease and the special acid protease can be added in the form of a mixture thereof. From the viewpoint of the gushing-preventing effect and operational convenience, it is preferable to add the acid protease to green beer at the end of the primary fermentation or to beer at the time of filtration or after filtration. Concerning the amount of the special acid protease to be added, the effective amount thereof is less than 100 ppm regardless of the amount of cysteine protease used. The addition of the special acid protease in an amount of more than 100 ppm will not lead to any practical improved result. In this connection, the proteolytic activity of the special acid protease adopted as the standard in prescribing the suitable amount of the acid protease was around 0.3 in terms of the absorbance at 660 nm of the final colored solution in the following assay method.

Method of measuring the activity of the enzyme:

To 1 ml of the enzyme solution containing 0.5 mg of the acid protease, 1 ml of 2% solution of milk casein (Hammersten) was added and the mixture was incubated for 10 minutes at 30° C., maintaining the optimum pH. The enzyme reaction was stopped by adding 2 ml of 0.4 M trichloroacetic acid and the mixture was filtered. To 1 ml of the filtrate, 5 ml of 0.4 M sodium carbonate and 1 ml of Folin-Ciocalteau reagent were added to develop a blue color. The absorbance at 660 nm was read against a blank using a 10 mm-cuvette.

The following are examples embodying the present invention. In the Examples, the kind of acid proteases was varied, the time for adding the acid protease was varied, and the amount of acid protease added was varied, respectively.

EXAMPLE I

To green beer at the end of the primary fermentation, there was added 20 ppm of papain together with acid protease Molsin (commercially available from Seishin Pharmaceutical Co., Ltd), produced by *Aspergillus saitoi*, in various concentrations. The maturation of the beers was completed according to the conventional process. The respective beers were packaged in 663 ml-bottles and the bottled beer was stored at 25° C. The market gushing tendency of the beers was tested. The results were as shown in the following Table-4. As is clear from these results, the gushing suppressing effect of the acid protease is conspicuous, and application of a small dosage thereof can manifest said effect.

Table-4

| Amount of acid protease added (ppm) | Gushing tendency (ml) after storing at 25° C. for | | | | |
|---|---|---|---|---|---|
| | 0 day | 30 days | 60 days | 90 days | 120 days |
| 0 | 0 | 10 | 45 | 60 | 80 |
| 1 | 0 | 0 | 0 | 0 | 0 |
| 2 | 0 | 0 | 0 | 0 | 0 |
| 20 | 0 | 0 | 0 | 0 | 0 |

EXAMPLE 2

Beer was brewed by adding 20 ppm of acid protease Newlase (commercially available from Amano Pharmaceutical Co., Ltd.), produced by *Rhizopus chinensis*, in the same manner as described in Example 1 and thereafter the gushing tendency thereof was examined. There was observed a conspicuous gushing-suppressing effect similar to that obtained in Example 1.

EXAMPLE 3

Beer was brewed by adding 2 ppm of acid protease Rapidase (commercially available from Takeda Chemical Industries, Ltd.), produced by *Trametes sanguinea*, in the same manner as described in Example 1 and thereafter the gushing tendency thereof was examined. The results were similar to the results in Example 1.

EXAMPLE 4

Beer was brewed by adding 20 ppm of acid protease, produced by *Aspergillus niger* (ATCC 16513) on the Koji culture, in the same manner as described in Example 1 and thereafter the gushing tendency thereof was examined. The results were similar to the results in Example 1.

EXAMPLE 5

Beer was brewed by adding 18 ppm of papain at the end of the main fermentation. After conventional maturation and cold storage of the beer, acid protease of *Aspergillus saitoi* was added in various amounts to the beer prior to the final filtration and the filtered beer was bottled in 633 ml-bottles. The bottled beer was then stored at 25° C. for 30 days and then the market gushing tendency was examined. The results were as shown in the following Table-5.

Table-5

| Amount of acid protease added (ppm) | Gushing tendency (ml) |
|---|---|
| 0 | 50 |
| 4 | 7 |
| 8 | 0 |
| 15 | 0 |
| 30 | 0 |

EXAMPLE 6

When the acid proteases produced by *Aspergillus niger*, *Rhizopus chinensis*, *Trametes sanguinea*, *Mucor pusillus*, and *Penicillium duponti* were respectively added to beer in the same manner as described in Example 5 and the market gushing tendency thereof was examined, a conspicuous gushing-suppressing effect was observed similar to that in Example 5, respectively.

EXAMPLE 7

Beer was brewed by adding 20 ppm of ficin together with an acid protease shown in Examples 1 to 4 at the same time as described in Example 1 and thereafter the gushing tendency thereof was examined. There was observed a conspicuous gushing-suppressing effect similar to that in Example 1.

EXAMPLE 8

Beer was brewed by adding 20 ppm of bromelain together with an acid protease shown in Examples 1 to 4 at the same time as described in Example 1 and thereafter the gushing tendency thereof was examined. There was observed a conspicuous gushing-suppressing effect similar to that in Example 1.

The embodiments of the invention in which an exclusive property or privilege is claimed are defined as follows:

1. The process of chill-proofing beer and rendering the beer free from a tendency to foam excessively when a retail sales container filled with the beer is opened after the filled container has been stored for an extended period of time, which consists essentially of the steps of: adding to the beer, prior to placing the beer in the retail sales container, a chill-proofing cysteine protease selected from the group consisting of papain, ficin and bromelain, the amount of said cysteine protease being effective to render the beer free of haze when cooled at 0° C., said cysteine protease also being effective to cause the beer to contain substances which cause excessive foaming of the beer when the retail sales container for the beer is opened after extended storage; and adding to the beer, prior to placing the beer in the retail sales container, an isolated acid protease of microbial origin-having the properties that (1) its activity is inhibited by the pepsin inhibitor S-PI having the formula (acetyl-valyl)-(valyl)-(4-amino-3-hydroxy-6-methyl heptanoic acid)-(alanyl)-(4-amino-3-hydroxy-6-methyl-heptanoic acid) which is produced by *Streptomyces naniwaensis* and (2) it is ineffective as a chill-proofing agent, the amount of said acid protease being effective to decompose said substances whereby to suppress excessive foaming of the beer when the retail sales container for the beer is opened after extended storage.

2. The process of claim 1 in which said acid protease is produced by the microorganism *Aspergillus niger*.

3. The process of claim 1 in which said acid protease is produced by the microorganism *Aspergillus saitoi*.

4. The process of claim 1 in which said acid protease is produced by the microorganism *Rhizopus chinensis*.

5. The process of claim 1 in which said acid protease is produced by the microorganism *Trametes sanguinea*.

6. A method according to claim 1 in which the acid protease is produced by a microorganism selected from the group consisting of *Aspergillus niger*, *Aspergillus carbonarius*, *Aspergillus ficuum*, *Aspergillus phoenicis*, *Aspergillus pulverulentus*, *Aspergillus awamori*, *Aspergillus heteromorphus*, *Aspergillus foetidus*, *Aspergillus aureus*, *Aspergillus japonicus*, *Aspergillus aculeatus*, *Aspergillus ellipticus*, *Aspergillus saitoi*, *Aspergillus sojae*, *Aspergillus inui*, *Aspergillus oryzae*, *Rhizopus chinensis*, *Trametes sanguinea*, *Mucor pusillus*, *Mucor miehei*, *Penicillium duponti*, *Penicillium janthinellum*, *Endomycopsis fibuligera* and *Rhodotorula glutinis*.

7. A method according to claim 6 in which the amount of the acid protease is from about 1 to 100 ppm.

* * * * *